No. 835,064. PATENTED NOV. 6, 1906.
B. P. GRAY.
HOOF PAD FOR HORSESHOES.
APPLICATION FILED AUG. 15, 1905.
3 SHEETS—SHEET 1.
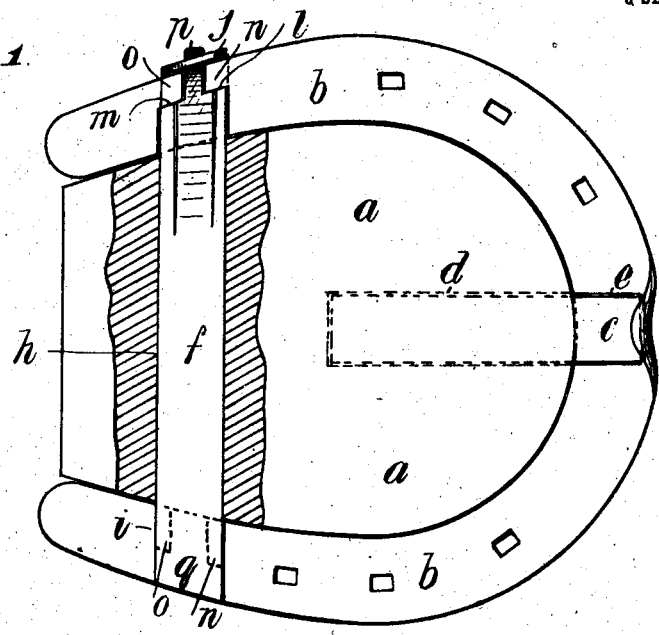
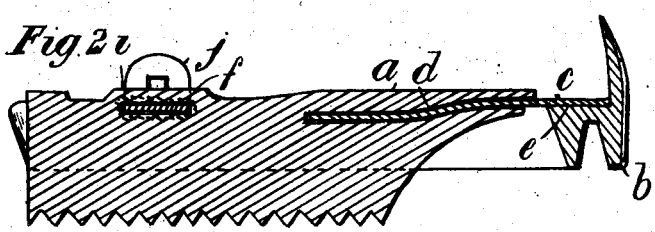
 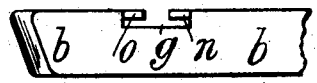
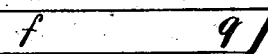
Witnesses
Inventor
Bertram P. Gray No. 835,064. PATENTED NOV. 6, 1906.
B. P. GRAY.
HOOF PAD FOR HORSESHOES.
APPLICATION FILED AUG. 15, 1905.
3 SHEETS—SHEET 2.
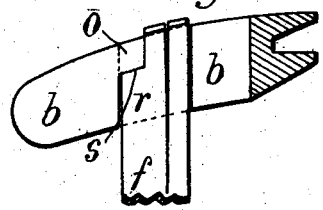
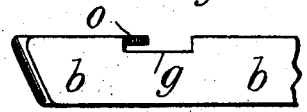
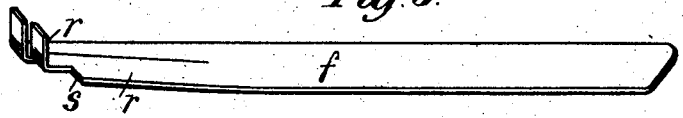
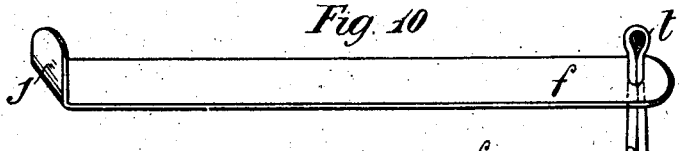
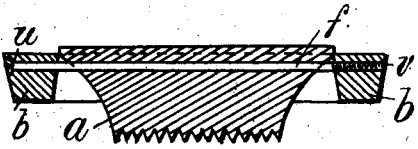
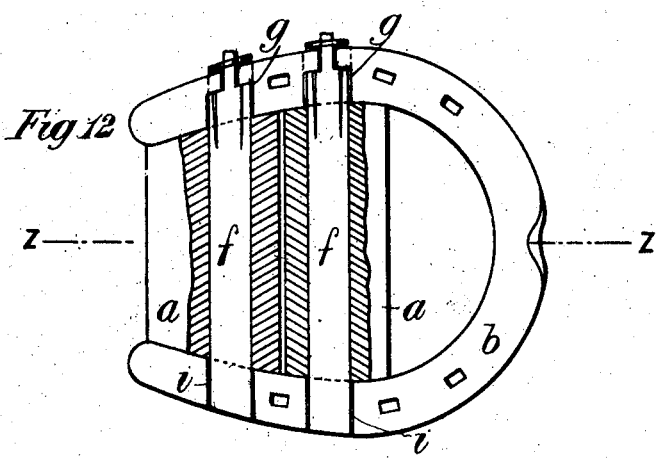
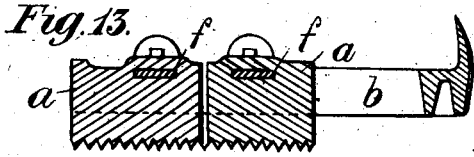
Witnesses
Inventor
Bertram P. Gray
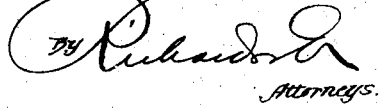
Attorneys.

No. 835,064. PATENTED NOV. 6, 1906.
B. P. GRAY.
HOOF PAD FOR HORSESHOES.
APPLICATION FILED AUG. 15, 1905.
3 SHEETS—SHEET 3.
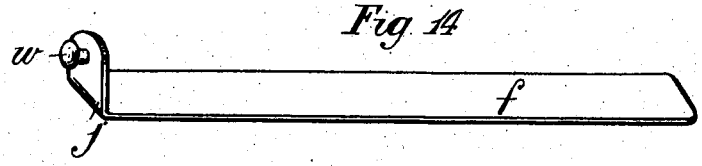
*Fig. 14*
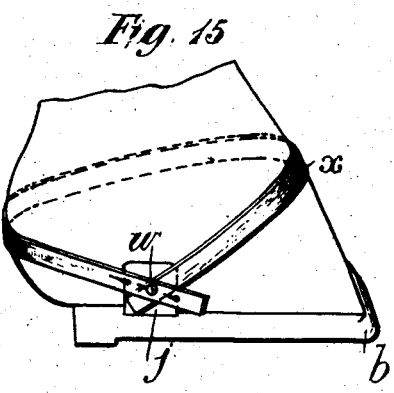
*Fig. 15*
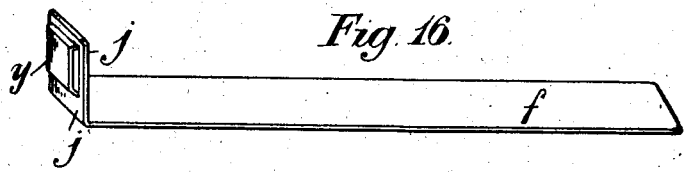
*Fig. 16*
Witnesses.
Inventor
Bertram P. Gray
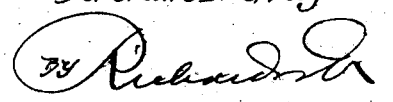
By
Attorneys

UNITED STATES PATENT OFFICE.

BERTRAM PARROTT GRAY, OF BIRMINGHAM, ENGLAND.

HOOF-PAD FOR HORSESHOES.

No. 835,064.     Specification of Letters Patent.     Patented Nov. 6, 1906.

Application filed August 15, 1905. Serial No. 274,314.

*To all whom it may concern:*

Be it known that I, BERTRAM PARROTT GRAY, solicitor, a subject of His Majesty the King of Great Britain and Ireland, residing at 122 Colmore Row, in the city of Birmingham, England, have invented new and useful Improvements in and Connected with Hoof-Pads for Horseshoes, of which the following is a specification.

This invention has reference to hoof-pads for horseshoes; and it consists in constructing the said pads and securing them to the shoes in the ways herein described, whereby the said pad can be very quickly fixed to or removed from the shoe without removing the shoe from the hoof.

In carrying out this invention I construct the hoof-pad of india-rubber or other suitable substance or combination of substances molded or otherwise made to a suitable shape so that it fits against the hoof within the shoe and is secured in this position by the means which I will describe by referring to the accompanying drawings, on which—

Figure 1 is a plan of a horseshoe with the removable pad fixed thereto in accordance with this invention. Fig. 2 is a central sectional view of Fig. 1. Fig. 3 is a cross-sectional elevation of the same through the center of the bar $f$, but without the pad. Fig. 4 is a plan of one of the heel parts of the said shoe. Fig. 5 is a side elevation of the same, and Fig. 6 is a separate view of the detachable cross-strip by which the hoof-pad is secured to the shoe. Fig. 7 is a plan showing one of the heel parts of the shoe and the end of the cross-strip engaging therewith to illustrate a modification of my invention. Fig. 8 is a side elevation of the part of the shoe shown by Fig. 7. Fig. 9 shows separately the cross strip or bar which is shown by Fig. 7. Fig. 10 shows a modified form of the cross strip or bar and means for securing it. Fig. 11 is a cross-sectional elevation of a horseshoe and pad to illustrate a slight modification of my invention. Fig. 12 is a sectional plan of a horseshoe and pad fastened together in accordance with a further modification of my invention, and Fig. 13 is a vertical sectional elevation of the same on line Z Z of Fig. 12. Fig. 14 shows a slightly-modified form of the cross strip or bar. Fig. 15 shows a horse's hoof and shoe with the cross strip or bar shown in Fig. 14 fixed thereto, and Fig. 16 shows a further modification of the said cross strip or bar.

The same letters of reference indicate the same or corresponding parts in all the figures.

$a$ is the india-rubber hoof-pad made to fit inside the shoe $b$ so as to be attached thereto or removed therefrom after the shoe has been nailed onto the horse's hoof.

In one arrangement of carrying out my invention (see Figs. 1 to 6, both inclusive,) I provide at the front of the pad $a$ a projecting metal flat section or other tongue $c$, which may be vulcanized into the india-rubber pad $a$ or may be made removable therefrom, so as to be changed for a longer or shorter tongue to suit the shoe with which the pad is used. A metal or other sheath $d$ may be molded in the pad for the reception of the tongue $c$. This tongue $c$ takes into a corresponding slot or recess $e$ in the toe part of the shoe. The back part of the pad $a$ is secured in position by a thin flat section metal cross strip or bar $f$, which passes transversely through holes or recesses $g$ $i$ in the back part of the shoe and also through a transverse hole $h$ in the pad $a$, so that when the cross strip or bar $f$ is secured in position in the shoe, as shown in Figs. 1 and 2, the pad $a$ is thus perfectly secure, but can readily be removed from the shoe by first withdrawing the cross strip or bar $f$ from the shoe and pad. Various means may be adopted for securing the cross strip or bar $f$ when in position in the pad and shoe, as shown in Figs. 1, 2, and 3. A method of construction which answers well in practice and which forms a feature of this invention is illustrated by these Figs. 1 to 6, where it will be seen that one end portion $j$ of the cross bar or strip $f$ is turned up, forming a kind of head, and raised out of the body of the cross bar or strip there is an upwardly-projecting tongue $k$, made with two shoulders $l$ $m$, which when the cross bar or strip $f$ is in position in the shoe take against projections $n$ $o$, which overhang the slot $g$ at the side of the shoe, and thus prevent the cross bar or strip $f$ from being withdrawn. It will be seen that when the cross bar or strip is pushed along the slot $g$ in the shoe under the overhanging projections $n$ $o$ the spring-tongue $k$ is by these overhanging parts $n$ $o$ pushed downwardly as the tongue rides under them until when the strip is pushed right home, as shown in Figs. 1 and 2, then the tongue $k$ springs upwardly again and its shoulders $l\ m$ take against the overhanging projections $n\ o$, and thus the cross bar or strip $f$ is effectually secured in position and cannot possibly shake loose. When it is desired to withdraw the cross bar or strip $f$, the extreme end $p$ of the tongue $k$ has to be pushed downwardly until the shoulders $l\ m$ will have cleared the overhanging parts $n\ o$, and then the cross bar or strip $f$ can be withdrawn and the pad $a$ is free to be removed from the shoe. In order to prevent the end $q$ of the cross bar or strip $f$ from riding out of the slot $i$ in case the shoe should be loose, said slot $i$ may be provided with overhanging parts $n\ o$, like the slot $g$, and as indicated by dotted lines in Fig. 1. A modification of this method of securing the cross bar or strip $f$ in the pad and shoe is illustrated by Figs. 7, 8, and 9. It will be seen that in this case the slot $g$ in the shoe $b$ is only made with one of the overhanging parts—namely, $o$—and the spring-tongue in this case (marked $r$) on the strip or bar $f$ is formed at one side of the same and has a shoulder $s$ to take against the end of the overhanging part $o$ to secure the cross bar or strip $f$ in position. Before the cross bar or strip $f$ can be removed the turned-up part of the tongue $r$ has to be pressed down for the shoulder $s$ to clear and pass under the overhanging projection $o$; or, another very secure way of fixing the cross bar or strip $f$ in the shoe and pad is by an ordinary cotter $t$, as in Fig. 10, which passes transversely through a hole in the end of the cross bar or strip $f$ outside the shoe.

When the cross bar or strip $f$ is secured by the strap or the like $x$, the upwardly-projecting end $j$ of the cross bar or strip $f$ has to be on the outside of the horse's hoof, and the cross bar or strip $f$ is made of such a length that its other end does not project beyond the side of the shoe.

The part of the pad $a$ through which the cross bar or strip $f$ passes may have embedded in it a metal or canvas insertion or other sleeve or sheath forming the hole for the crossbar.

The cross bar or strip $f$ is by preference made of flat section, as above described; but, if desired, any other suitable section may be substituted and any other suitable or convenient means may be adopted for securing the cross bar or strip in the transverse hole in the shoe and pad—for instance, (see Fig. 11,) where the cross bar or strip $f$ takes the form of a long wire screw, which is passed through corresponding holes $u\ v$ in the shoe and pad, the hole $v$ being tapped for the end of the screw to screw into. The tongue $c$, which secures the front of the pad, may, if desired, be dispensed with and the pad secured to the shoe by one, two, or more of the said cross bars or strips or wires $f$, which pass through transverse holes in the shoe and in the pad, as above described. For instance, Figs. 12 and 13 show the pad $a$ secured to the shoe $b$ by two of the cross bars or strips $f$ of the kind above described with reference to Figs. 1 to 6, both inclusive, the shoe being made with two of the slots $g$ and $i$ for the reception of the two strips $f$.

Another very effective way of fixing the cross bar or strip $f$ in the shoe and pad is illustrated by Figs. 14 and 15. In this case the upwardly-turned end $j$ of the cross bar or strip $f$ is made with a projecting stud $w$, with which the end of a strap $x$ is engaged, and this strap is passed round the horse's hoof, as in Fig. 15, and the other end connected onto the stud $w$, thus effectually preventing the cross bar or strip $f$ from moving endwise, or, instead of the head $j$ being made with a stud $w$, as in Figs. 14 and 15, said end may, if desired, be made with a projecting loop $y$, as in Fig. 16, or be made with a hole through which the strap can be threaded. It will be evident that, instead of a strap, a piece of string or cord, boot-lace, wire, or the like may be passed round the horse's hoof in a similar manner and engaged with the head $j$ of the cross bar or strip $f$ to secure it in position.

The transverse slots or holes in the shoe through which the cross-bar passes or cross-bars pass to secure the pad, as above described, may either be made as open-topped slots or recesses, such as $g$ and $i$, in the upper surface of the shoe with or without the overhanging projections $n\ o$, or, as shown in Fig. 11, they may be complete transverse holes $u\ v$ at a short distance below the upper surfaces of the shoe, the holes or slots being made of any shape to suit the cross bars, strips, wires, or screws which fit in them.

What I claim as my invention, and desire to secure by Letters Patent, is—

1. The combination with a horseshoe, of a detachable hoof-pad fitted within the shoe after the latter has been nailed on the hoof, and one or more metal cross strips or bars adapted to be inserted endwise in side slots in the shoe and pad, to secure the pad thereto, or to be withdrawn endwise therefrom, with spring means for securing the cross bar or strip in said slots, substantially as described.

2. The combination with a horseshoe, of a detachable hoof-pad fitted within the shoe after the latter has been nailed on the hoof, said hoof-pad having a front metal tongue taking into a slot in the shoe, and one or more metal cross strips or bars adapted to be inserted endwise in side slots in the shoe and pad, to secure the pad thereto, or to be withdrawn endwise therefrom, with spring means for securing the cross bar or strip in said slots, substantially as described.

3. The combination with a horseshoe and detachable hoof-pad, of one or more metal cross strips or bars adapted to be inserted endwise in side slots in the shoe and pad to secure the pad thereto, or to be removed endwise therefrom, said metal cross strip or bar having at one end a head and a spring-tongue which engages with projections on the shoe when the cross bar or strip has been inserted in position therein, said tongue being adapted to be released from the projections when pressed toward the shoe, substantially as set forth.

In testimony whereof I have signed my name to this specification in the presence of two subscribing witnesses.

BERTRAM PARROTT GRAY.

Witnesses:
CHARLES BOSWORTH KETLEY,
THOMAS JOHN ROWE.